US012092044B1

(12) United States Patent
Hannon, Jr. et al.

(10) Patent No.: US 12,092,044 B1
(45) Date of Patent: Sep. 17, 2024

(54) FUEL TANK ISOLATION VALVE CONTROLS AND DIAGNOSTICS

(71) Applicant: GM GLOBAL TECHNOLOGY OPERATIONS LLC, Detroit, MI (US)

(72) Inventors: Brian Patrick Hannon, Jr., Grand Blanc, MI (US); Kevin Patrick Aldridge, Farmington Hills, MI (US); Darrell W Burleigh, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/316,633

(22) Filed: May 12, 2023

(51) Int. Cl.
*F02D 41/00* (2006.01)
*F02M 25/08* (2006.01)

(52) U.S. Cl.
CPC ....... *F02D 41/004* (2013.01); *F02M 25/0809* (2013.01); *F02M 25/0836* (2013.01); *F02M 25/0854* (2013.01); *F02D 2200/0602* (2013.01); *F02D 2200/50* (2013.01)

(58) Field of Classification Search
CPC ............... F02M 25/08; F02M 25/0809; F02M 25/0836; F02M 25/0854; F02D 41/00; F02D 41/0035; F02D 41/004; F02D 2200/0602
See application file for complete search history.

(56) References Cited

U.S. PATENT DOCUMENTS

| | | | | |
|---|---|---|---|---|
| 11,359,582 B1 * | 6/2022 | Dudar | ................ | F02M 25/0836 |
| 11,441,498 B1 * | 9/2022 | Dudar | ................ | F02M 25/0854 |
| 2006/0053868 A1 * | 3/2006 | Chung | ............... | F02M 25/0827 73/49.7 |
| 2011/0197862 A1 * | 8/2011 | Der Manuelian | .. | F02M 25/0809 123/521 |

* cited by examiner

*Primary Examiner* — Logan M Kraft
*Assistant Examiner* — Johnny H Hoang
(74) *Attorney, Agent, or Firm* — Lorenz & Kopf LLP

(57) ABSTRACT

Methods and systems are provided for an evaporative emissions system of a vehicle. In an exemplary embodiment, the evaporative emissions system includes an engine; a fuel tank configured to provide fuel for the engine; a plurality of sensors configured to generate sensor data for the evaporative emissions system; a carbon canister configured to capture carbon emissions from the fuel tank; a first valve disposed between the carbon canister and the engine; a second valve disposed between the fuel tank and the carbon canister; and one or more processors that are configured to at least facilitate selectively controlling opening and closing of the first and second valves, to thereby control carbon emissions from the carbon canister and maintain performance of the engine, using the sensor data.

17 Claims, 6 Drawing Sheets

FUEL TANK ISOLATION VALVE CONTROLS AND DIAGNOSTICS

TECHNICAL FIELD

The technical field generally relates to vehicles and, more specifically, to fuel tanks of vehicles.

BACKGROUND

Certain vehicles today have internal combustion engines that utilize a fuel tank along with a carbon canister for collecting hydrocarbons and thereby limiting carbon emissions. However, existing techniques may not always be optimal, for example in reducing carbon emissions while also maintaining engine performance in various circumstances.

Accordingly, it is desirable to provide improved methods and systems for controlling an evaporative emissions system of a vehicle, for example for reducing carbon emissions while maintaining engine performance. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, an evaporative emissions system is provided for a vehicle, the fuel system including: that includes an engine: a fuel tank configured to provide fuel for the engine: a plurality of sensors configured to generate sensor data for the evaporative emissions system: a carbon canister configured to capture carbon emissions from the fuel tank; a first valve disposed between the carbon canister and the engine; a second valve disposed between the fuel tank and the carbon canister; and one or more processors that are configured to at least facilitate selectively controlling opening and closing of the first and second valves, to thereby control carbon emissions from the carbon canister and maintain performance of the engine, using the sensor data.

Also in an exemplary embodiment, the one or more processors are further configured to at least facilitate: determining, using the sensor data, whether conditions are appropriate for aggressive purging of the carbon canister, using the sensor data; when it is determined that the conditions are appropriate for the aggressive purging, commanding the first valve to be open and the second valve to be closed while providing instructions for the aggressive purging at a first flow rate; and when it is determined that the conditions are not appropriate for the aggressive purging, commanding the second valve to be open while providing instructions for conservative purging at a second flow rate that is less than the first flow rate.

Also in an exemplary embodiment, the one or more processors are further configured to at least facilitate determining whether the conditions are appropriate for the aggressive purging based on a transmission state of the vehicle, a fuel tank pressure, and diagnostics performed on the evaporative emissions system.

Also in an exemplary embodiment, the plurality of sensors include a plurality of pressure sensors configured to measure a plurality of pressure values for the evaporative emissions system; and the one or more processors are configured to at least facilitate selectively controlling the second valve using the plurality of pressure values.

Also in an exemplary embodiment, the plurality of pressure sensors include: a first pressure sensor disposed between the second valve and the carbon canister and configured to measure a first pressure therebetween; and a second pressure sensor disposed between the fuel tank and the second valve and configured to measure a second pressure proximate the fuel tank; and the one or more processors are configured to selectively control the second valve using both the first pressure and the second pressure.

Also in an exemplary embodiment, the one or more processors are further configured to at least facilitate: determining a difference between the first pressure and the second pressure; and selectively controlling the second valve using the difference between the first pressure and the second pressure.

Also in an exemplary embodiment, the evaporative emissions system further comprises a vent solenoid, and the one or more processors are further configured to at least facilitate: performing diagnostics for the evaporative emissions system, by selectively generating and releasing a vacuum in the evaporative emissions system via selective opening and closing of the first valve and the vent solenoid, and determining the difference between the first pressure and the second pressure as the vacuum is generated and released; and utilizing the diagnostics for control of carbon emissions for the evaporative emissions system.

In another exemplary embodiment, a method is provided for controlling carbon emissions of an evaporative emissions system of a vehicle having an engine, a fuel tank configured to provide fuel for the engine, and a carbon canister configured to capture carbon emissions from the fuel tank, the method including: obtaining sensor data via a plurality of sensors for the evaporative emissions system; and selectively controlling opening and closing of a first valve disposed between the carbon canister and the engine and a second valve disposed between the fuel tank and the carbon canister, via one or more processors, to thereby control carbon emissions from the carbon canister and maintain performance of the engine, using the sensor data.

Also in an exemplary embodiment, the method further includes: determining, via the one or more processors using the sensor data, whether conditions are appropriate for aggressive purging of the carbon canister: when it is determined that the conditions are appropriate for the aggressive purging, commanding, via the one or more processors, the first valve to be open and the second valve to be closed while providing instructions for the aggressive purging at a first flow rate; and when it is determined that the conditions are not appropriate for the aggressive purging, commanding, via the one or more processors, the second valve to be open while providing instructions for conservative purging at a second flow rate that is less than the first flow rate.

Also in an exemplary embodiment, the determining of whether the conditions are appropriate for the aggressive purging is made via the one or more processors based on a transmission state of the vehicle, a fuel tank pressure, and diagnostics performed on the evaporative emissions system.

Also in an exemplary embodiment: the step of obtaining the sensor data includes measuring a plurality of pressure values via a plurality of pressure sensors for the evaporative emissions system; and the method further includes selectively controlling the second valve, via the one or more processors, using the plurality of pressure values.

Also in an exemplary embodiment, the step of measuring the plurality of pressure values includes: measuring a first pressure between the second valve and the carbon canister via a first pressure sensor disposed therebetween; and measuring a second pressure between the second valve and the fuel tank via a second pressure sensor disposed therebetween.

Also in an exemplary embodiment, the method further includes: determining, via the one or more processors, a difference between the first pressure and the second pressure; and selectively controlling the second valve, via the one or more processors, using the difference between the first pressure and the second pressure.

Also in an exemplary embodiment, the method further includes: performing diagnostics for the evaporative emissions system, via the one or more processors, by selectively generating and releasing a vacuum in the evaporative emissions system via selective control of the first valve and a vent solenoid, via the one or more processors: determining the difference between the first pressure and the second pressure, via the one or more processors, as the vacuum is generated and released; and utilizing the diagnostics for control of carbon emissions for the evaporative emissions system, via the one or more processors.

In another exemplary embodiment, a control system is provided for controlling carbon emissions of an evaporative emissions system of a vehicle having an engine, a fuel tank configured to provide fuel for the engine, and a carbon canister configured to capture carbon emissions from the fuel tank, the control system including: a plurality of sensors configured to obtain sensor data for the evaporative emissions system; and one or more processors that are coupled to the plurality of sensors and that are configured to at least facilitate selectively controlling opening and closing of a first valve disposed between the carbon canister and the engine and a second valve disposed between the fuel tank and the carbon canister, to thereby control carbon emissions from the carbon canister and maintain performance of the engine, using the sensor data.

Also in an exemplary embodiment, the one or more processors are further configured to at least facilitate: determining, using the sensor data, whether conditions are appropriate for aggressive purging of the carbon canister: when it is determined that the conditions are appropriate for the aggressive purging, commanding the first valve to be open and the second valve to be closed while providing instructions for the aggressive purging at a first flow rate; and when it is determined that the conditions are not appropriate for the aggressive purging, commanding the second valve to be open while providing instructions for conservative purging at a second flow rate that is less than the first flow rate.

Also in an exemplary embodiment, the one or more processors are further configured to at least facilitate determining whether the conditions are appropriate for the aggressive purging based on a transmission state of the vehicle, a fuel tank pressure, and diagnostics performed on the evaporative emissions system.

Also in an exemplary embodiment: the plurality of sensors include a plurality of pressure sensors configured to measure a plurality of pressure values for the evaporative emissions system; and the one or more processors are further configured to at least facilitate selectively controlling the second valve using the plurality of pressure values.

Also in an exemplary embodiment, the plurality of pressure sensors include: a first pressure sensor disposed between the second valve and the carbon canister and configured to measure a first pressure therebetween; and a second pressure sensor disposed between the second valve and the fuel tank and configured to measure a second pressure therebetween; and the one or more processors are further configured to at least facilitate: determining a difference between the first pressure and the second pressure; and selectively controlling the second valve using the difference between the first pressure and the second pressure.

Also in an exemplary embodiment, the one or more processors are further configured to at least facilitate: performing diagnostics for the evaporative emissions system by selectively generating and releasing a vacuum in the evaporative emissions system via selective opening and closing of the first valve and a vent solenoid, via the one or more processors: determining the difference between the first pressure and the second pressure as the vacuum is generated and released; and utilizing the diagnostics for control of carbon emissions for the evaporative emissions system.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
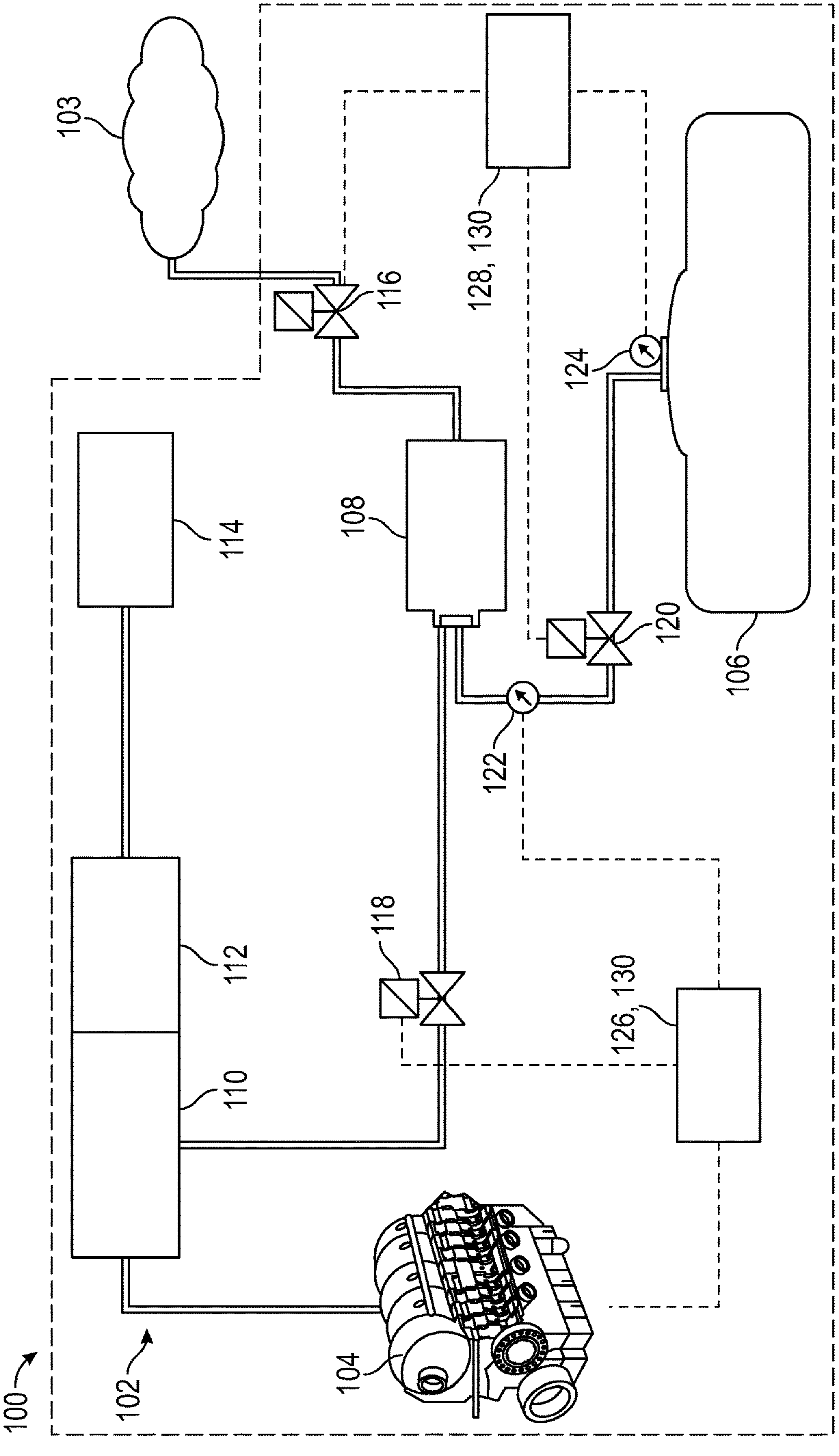
FIG. 1 is a functional block diagram of a vehicle having an evaporative emissions system that includes a control system for controlling carbon emissions while maintaining engine performance, in accordance with exemplary embodiments.

FIG. 1 illustrates a vehicle 100. In various embodiments, and as described below, the vehicle 100 includes an evaporative emissions system 102 that includes, among other features, an engine 104, a fuel tank 106, and one or more control systems 130 that are configured to control carbon emissions (e.g., gaseous emissions) from the evaporative emissions system 102 (including from the fuel tank 106) from escaping into the air 103 while maintaining performance of the engine 104, in accordance with the steps of the process 300 described further below in connection with FIGS. 3-7.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

Also in various embodiments, the engine 104 comprises an internal combustion engine. In addition, in various embodiments, the engine 104 operates using fuel, such as gasoline fuel, diesel fuel, one or more "flex fuels" (e.g., a mixture of gasoline and alcohol), a gaseous compound (e.g., hydrogen and/or natural gas), and/or one or more other types of fuel stored in the fuel tank 106.

As depicted in FIG. 1, in various embodiments the evaporative emissions system 102 includes, in addition to the engine 104 and the fuel tank 106, a carbon canister 108, an intake manifold 110, a throttle body 112, an air filter 114, an vent solenoid 116, a purge valve 118, a fuel tank isolation valve (FTIV) 120, a first pressure sensor 122, a second pressure sensor 124, an engine control module (ECM) 126, and a fuel tank zone module (FTZM) 128.

In various embodiments, the intake manifold 110 distributes air to the engine 104, and the throttle body 112 helps to control the flow of outside air into the engine 104 after the outside air passes through the air filter 114.

Also in various embodiments, the carbon canister 108 is coupled to the fuel tank 106, and controls hydrocarbon emissions/vapor that would otherwise flow through the vent solenoid 116 into the outside air 103 in the environment surrounding the vehicle 100. In various embodiments, the vent solenoid 116 is utilized during diagnostics when measuring the difference between the two pressure sensors. Specifically, the vent solenoid 116, when closed, allows vacuum to be built in the system to execute the diagnostics.

In addition, in various embodiments, the purge valve 118 is disposed between the carbon canister 108 and the intake manifold 110, and provides a restriction therebetween. In various embodiments, the purge valve 118 thereby regulates the flow that is supplied to the engine 104. Also in various embodiments, carbon emissions are purged from the carbon canister 108 via the purge valve 118 when the engine 104 is running (e.g., when the purge valve is biased open for a relatively longer time as compared with typical or default operation thereof). In various embodiments, the purge valve 118 is capable of being biased open or biased closed quickly based on pulse width modulation (PWM). In certain embodiments, the purge valve 118 is operated in connection with a control algorithm (e.g., in accordance with the process 300 of FIGS. 3-7) in a manner that provides for purging of carbon emissions from the carbon canister 108 while also maintaining a dry quality of the engine 104 so as to maintain performance of the engine 104 (e.g., by preventing stalling of the engine 104).

Also as depicted in FIG. 1, in various embodiments, the fuel tank isolation valve (FTIV) 120 is disposed between the fuel tank 106 and the carbon canister 108, and provides a restriction therebetween. In various embodiments, FTIV 120 selectively controls flow of fuel, including hydrocarbons, to the carbon canister 108. In certain embodiments, the FTIV 120 includes a small orifice (e.g., an intentional leak orifice) that allows a small amount of flow through the FTIV 120 even when the FTIV 120 is closed. In certain embodiments, the FTIV 120 is approximately ⅝ of an inch (i.e., 15.875 millimeters) in nominal diameter, whereas the orifice is approximately 1/80,000 of an inch (i.e., 0.3175 micrometer) in nominal diameter. Also in various embodiments, the FTIV 120 is also controlled (e.g., selectively opened and closed) in connection with a control algorithm (e.g., in accordance with the process 300 of FIGS. 3-7) in a manner that provides for purging of carbon emissions from the carbon canister 108 while also maintaining a dry quality of the engine 104 so as to maintain performance of the engine 104 (e.g., by preventing stalling of the engine 104).

In various embodiments, the first pressure sensor 122 and the second pressure sensor 124 obtain pressure measurements that are utilized in controlling the purge valve 118 and the FTIV 120. Specifically, in various embodiments, comparisons are made via one or more control systems 130 as to differences between the pressure measurements of the first pressure sensor 122 versus the second pressure sensor 124, and these comparisons are utilized for selective control of the purge valve 118 and the FTIV. 120 in accordance with the process 300 of FIGS. 3-7 as described in greater detail further below.

As illustrated in FIG. 1, in various embodiments, the ECM 126 and the FTZM 128 may be both be control systems 130. In certain embodiments, the ECM 126 controls the purge valve 118 whereas the FTZM 128 controls the FTIV 120. However, this may vary in certain embodiments, for example that in various embodiments the ECM 126 and/or the FTZM 128 may either individually and/or collectively control either or both of the purge valve 118 and/or the FTIV 120.

Figure 2:
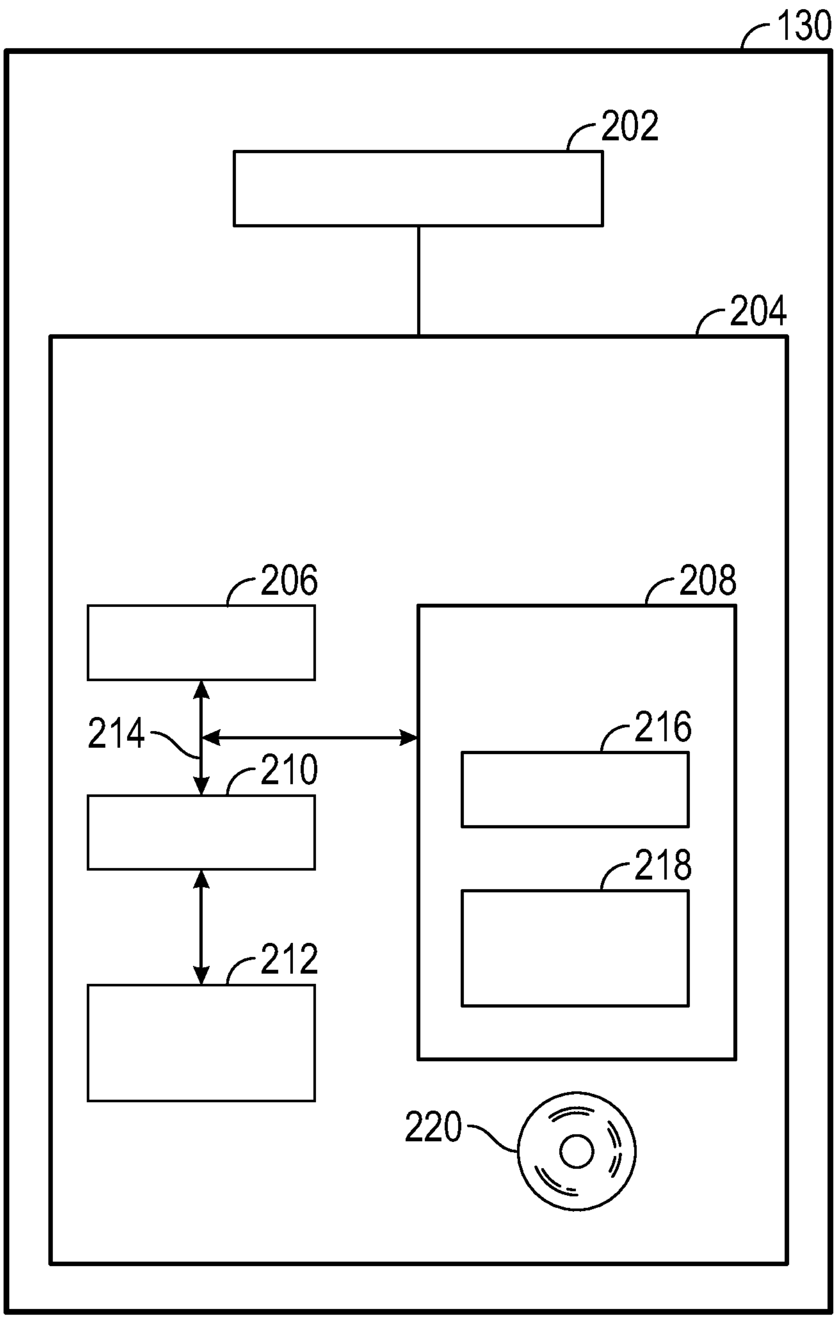
FIG. 2 is a functional block diagram of a control system that is used in connection with the vehicle of FIG. 1 for controlling carbon emissions while maintaining engine performance, in accordance with exemplary embodiments.

With reference to FIG. 2, a functional block diagram is provided for a control system 130, and that can be implemented as one or both of the control systems 130 of FIG. 1 in accordance with exemplary embodiments. In various embodiments, as alluded to above, the control system 130 (e.g., as depicted in FIG. 2 and described below in connection therewith) may include the ECM 126 of FIG. 1, the FTZM 128 of FIG. 1, or both.

In various embodiments, as depicted in FIG. 2, the control system 130 comprises a plurality of sensors 202 and a controller (or computer system) 204.

In various embodiments, the plurality of sensors 202 include pressure sensors, such as the first pressure sensor 122 and the second pressure sensor 124 of FIG. 1. In certain embodiments, the plurality of sensors 202 may also include various other sensors, such as one or more transmission state sensors (e.g., that detect whether the vehicle 100 is in a drive, reverse, park, or other transmission state), diagnostic sensors (e.g., that detect faults in one or more components of the evaporative emissions system 102, such as the purge valve 118 and the FTIV 120), temperature sensors (e.g., an engine coolant temperature sensor and an intake air temperature sensors), one or more timers (e.g., to measure an amount of time between ignition cycles for the engine 104), and/or one or more other types of sensors.

Also in various embodiments, the controller (or computer system) 204 is coupled to the plurality of sensors 202, and provides the decision making functionality for the control system 130, including selective operation of the purge valve 118 and the FTIV 120 based on the sensor data and in accordance with the steps of the process 300 described further below in connection with FIGS. 3-7. Also in various embodiments, the controller (or computer system) 204 includes a processor 206, a memory 208, an interface 210, a storage device 212, and a computer bus 214 as depicted in FIG. 2.

It will be appreciated that the control system 130 may otherwise differ from the embodiment depicted in FIG. 2. For example, the control system 130 may be coupled to or may otherwise utilize one or more remote computer systems and/or other control systems, for example as part of one or more devices and systems of the vehicle of FIG. 1.

In the depicted embodiment, the controller (or computer system) 204 of the control system 130 includes a processor

206, a memory 208, an interface 210, a storage device 212, and a bus 214. The processor 206 performs the computation and control functions of the control system 130, and may comprise any type of processor or multiple processors, single integrated circuits such as a microprocessor, or any suitable number of integrated circuit devices and/or circuit boards working in cooperation to accomplish the functions of a processing unit. In addition, as used herein, the term "processor" may include one or more different types of processors, computers, microcontrollers, or the like, or any combination thereof. During operation, the processor 206 executes one or more programs 216 contained within the memory 208 and, as such, controls the general operation of the control system 130 and the computer system 204 thereof, generally in executing the processes described herein, such as the processes and implementations depicted in FIGS. 3-7 and as described further below in connection therewith.

The memory 208 can be any type of suitable memory. For example, the memory 208 may include various types of dynamic random access memory (DRAM) such as SDRAM, the various types of static RAM (SRAM), and the various types of non-volatile memory (PROM, EPROM, and flash). In certain examples, the memory 208 is located on and/or co-located on the same computer chip as the processor 206. In the depicted embodiment, the memory 208 stores the above-referenced program 216 along with stored values 218 (e.g., that may include threshold values for controlling operation of the purge valve 118 and the FTIV 120, and so on).

The bus 214 serves to transmit programs, data, status and other information or signals between the various components of the computer system of the control system 130. The interface 210 allows communication to the computer system of the control system 130, for example from a system driver and/or another computer system, and can be implemented using any suitable method and apparatus. In one embodiment, the interface 210 obtains the various data from the plurality of sensors 202. The interface 210 can include one or more network interfaces to communicate with other systems or components. The interface 210 may also include one or more network interfaces to communicate with technicians, and/or one or more storage interfaces to connect to storage apparatuses, such as the storage device 212.

The storage device 212 can be any suitable type of storage apparatus, including various different types of direct access storage and/or other memory devices. In one exemplary embodiment, the storage device 212 comprises a program product from which memory 208 can receive a program 216 that executes one or more embodiments of the processes and implementations of FIGS. 3-7 and as described further below in connection therewith. In another exemplary embodiment, the program product may be directly stored in and/or otherwise accessed by the memory 208 and/or a secondary storage device (e.g., disk 220), such as that referenced below.

The bus 214 can be any suitable physical or logical means of connecting computer systems and components. This includes, but is not limited to, direct hard-wired connections, fiber optics, infrared and wireless bus technologies. During operation, the program 216 is stored in the memory 208 and executed by the processor 206.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 206) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control system 130 may also otherwise differ from the embodiment depicted in FIGS. 1 and 2, for example in that the computer system of the control system 130 may be coupled to or may otherwise utilize one or more remote computer systems and/or other control systems.

Figure 3:
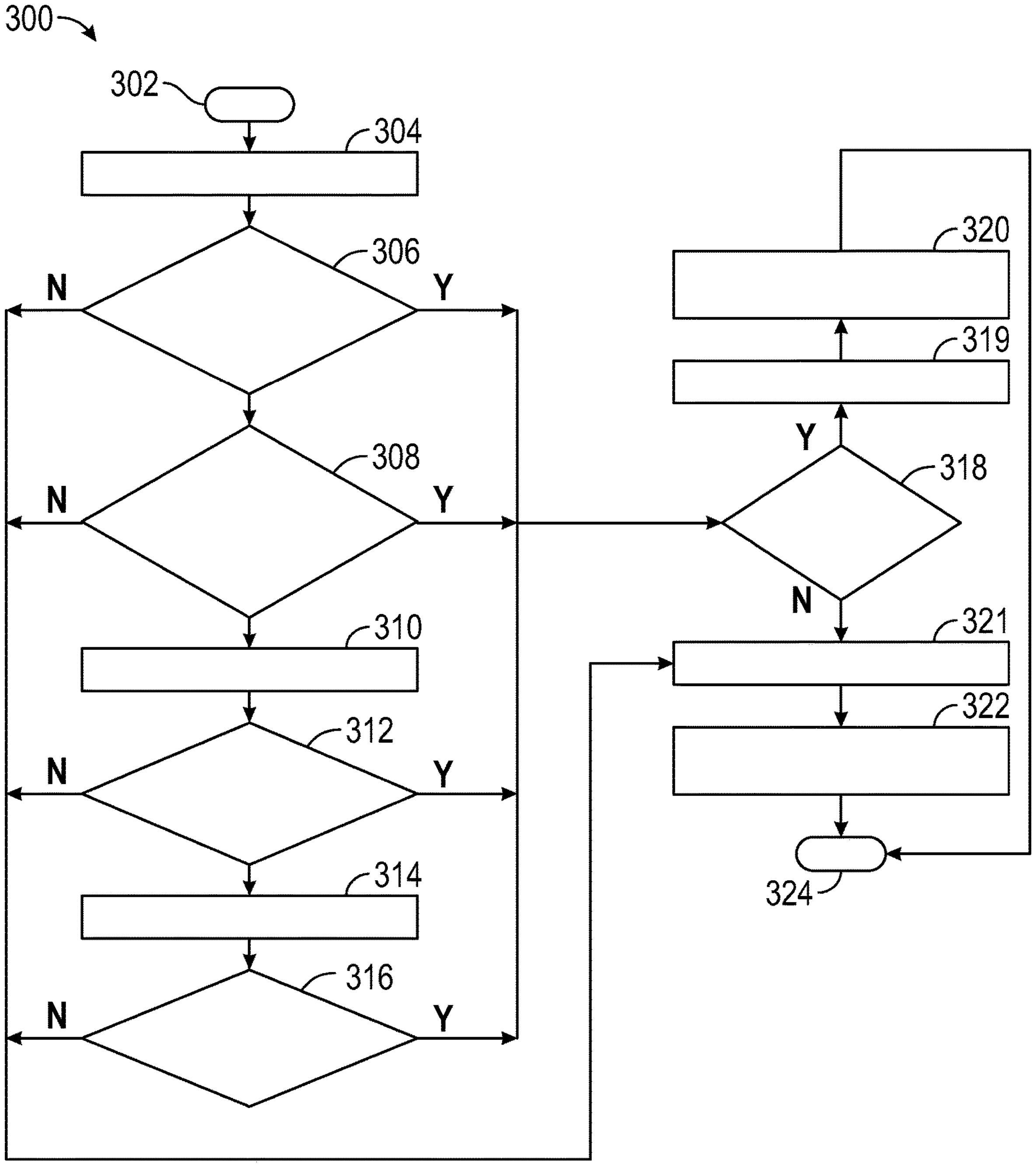
FIG. 3 is a flowchart of a process for controlling carbon emissions while maintaining engine performance, and that can be utilized in connection with the vehicle and evaporative emissions system of FIG. 1, including in connection with the control system of FIGS. 1 and 2, in accordance with exemplary embodiments.

FIG. 3 is a flowchart of a process 300 for controlling carbon emissions of a vehicle while maintaining engine performance, in accordance with exemplary embodiments. In various embodiments, the process 300 of FIG. 3 can be utilized in connection with the vehicle 100 of FIG. 1, including the evaporative emissions system 102 of FIG. 1, and including the control system(s) 130 of FIGS. 1 and 2 and other components of the evaporative emissions system 102, in accordance with exemplary embodiments. The process 300 is described below in connection with FIG. 3 as well as FIGS. 4-7, which describe various steps of the process 300 of FIG. 3 in greater detail in accordance with exemplary embodiments.

As depicted in FIG. 3, the process 300 begins at step 302. In various embodiments, the process 300 begins when the vehicle 100 of FIG. 1 is started or when the vehicle 100 begins operating in a current drive cycle, and/or in certain embodiments when a driver enters, approaches, and/or turns on the vehicle 100. In various embodiments, the steps depicted in FIG. 3 are performed, preferably continuously, throughout the duration of the process 300.

In various embodiments, sensor data is obtained (step 304). In various embodiments, sensor data is obtained from the plurality of sensors 202 of FIG. 2, including the first pressure sensor 122 and the second pressure sensor 124 as well as from one or more additional sensors. Specifically, in various embodiments, the sensor data includes, among other possible sensor data: (i) pressure readings from the first pressure sensor 122 of FIG. 1 (i.e., pressure between the carbon canister 108 and the engine 104): (ii) (pressure readings from the second pressure sensor 124 (i.e., pressure between the carbon canister 108 and the fuel tank 106); and (iii) a transmission state for the vehicle 100 (i.e., whether the vehicle 100 is in a park, drive, reverse, neutral, and/or transmission state of the vehicle 100). Also in various embodiments, the sensor data also includes, among other possible sensor data, a coolant temperature for coolant for the engine 104, an intake air temperature, and an amount of time since the engine 104 has last operated for the vehicle 100.

Also, in various embodiments, determinations are made during steps 306-316 as to whether various conditions are satisfied for the process 300. In various embodiments, these determinations are made, using the sensor data of step 304, by one or more processors (e.g., one or more processors 206 of FIG. 1 of one or more control systems 130 of FIGS. 1 and 2, such as from one or both of the ECM 126 and/or FTZM 128 of FIG. 1).

Specifically, in various embodiments, a determination is made as to whether the fuel tank pressure is within a predetermined range (step 306). In various embodiments, this determination is made by one or more processors 206 based on readings from the second pressure sensor 124 of FIG. 1, based on whether the fuel tank pressure within a predetermined acceptable range (e.g., as stored in the memory 216 in FIG. 2 as stored values 218 thereof).

In various embodiments, if it is determined in step 306 that the fuel tank pressure in within the predetermined range, then the process 300 proceeds to step 318, described further below. Conversely, if it is instead determined in step 306 that the fuel tank pressure is not within the predetermined range, then the process 300 proceeds instead to step 321, also described further below.

Also in various embodiments, a determination is made as to whether the transmission state of the vehicle 100 is in a forward or reverse transmission state (step 308). In various embodiments, this determination is made by one or more processors 206 based on sensor data provided by one or more of the plurality of sensors 202 of FIG. 2 (e.g., via one or more transmission sensors thereof).

In various embodiments, if it is determined in step 308 that the vehicle 100 is currently operating in either a forward transmission state or a reverse transmission state, then the process 300 proceeds to step 318, described further below. Conversely, if it is instead determined in step 308 that the vehicle 100 is not operating in either a forward transmission state or a reverse transmission state (e.g., if the vehicle 100 is in a park transmission state), then the process 300 proceeds instead to step 321, also described further below.

Also in various embodiments, diagnostics are performed (step 310). In various embodiments, the diagnostics of step 310 are performed with respect to the evaporative emissions system 102 (e.g., including diagnostics as to the purge valve 118, FTIV 120, and the first and second pressure sensors 122, 124) via one or more processors 206 based on the sensor data of step 304, including the pressure values obtained via the first and second pressure sensors 122, 124. In various embodiments, the diagnostics of step 310 are performed in accordance with steps of FIGS. 4-7, which are described in greater detail further below in connection therewith.

In various embodiments, a determination is made as to whether the diagnostics are complete (step 312). In various embodiments, this determination is made by one or more processors 206 based on whether the diagnostic steps illustrated in FIGS. 4-7 (and described further below) are complete.

In various embodiments, if it is determined in step 312 that the diagnostics are complete, then the process 300 proceeds to step 318, described further below. Conversely, if it is instead determined in step 312 that the diagnostics are not complete, then the process 300 proceeds instead to step 321, also described further below.

Also in various embodiments, fault analysis is performed (step 314). In various embodiments, based on the diagnostics of step 310 (e.g., as described in greater detail further below in connection with FIGS. 4-7), an analysis is provided via one or more processors 206 as to there are any faults in connection with the evaporative emissions system 102 (e.g., as to whether there are any faults in the purge valve 118, FTIV 120, first pressure sensor 122, and/or second pressure sensor 124).

In various embodiments, a determination is made as to whether no relevant faults are active (step 316). In various embodiments, this determination is made by one or more processors 206 based on the fault analysis of step 314 with respect to the evaporative emissions system 102.

In various embodiments, if it is determined in step 316 that no faults are active, then the process 300 proceeds to step 318, described below. Conversely, if it is instead determined in step 316 that one or more faults are active, then the process 300 proceeds instead to step 321, also described below.

As described above, in various embodiments, if any of the conditions of steps 306, 308, 312, and/or 316 are satisfied, then the process 300 proceeds to step 318. Also in various embodiments, during step 318 a determination is made as to whether each of the conditions of steps 306, 308, 312, and 316 are satisfied. In various embodiments, this determination is also made by one or more processors 206.

In various embodiments, when it is determined in step 318 that each of the conditions of steps 306, 312, and 316 are satisfied (namely, that the fuel tank pressure is within the predetermined range, and that the transmission state is in either the forward or reverse gear, and that the diagnostics are complete, and that no relevant faults are active), then the process 300 proceeds to step 319, as the FTIV 120 is closed. Specifically, in various embodiments, during step 319, the controller(s) 130 provide instructions for the FTIV 120 to move to a closed position, and the instructions are implemented via the FTIV 120 and/or via one or more actuators thereof and/or coupled thereto. Also in various embodiment, when this occurs, purge flow is applied in accordance with a first flow calibration setting (step 320). In various embodiments, a relatively more aggressive purging of the carbon canister 108 is performed (in contrast to step 322 below). Specifically, in various embodiments, during step 320, the controller(s) 130 control purge flow of carbon emissions from the carbon canister 108 to the engine 104 at a first (relatively fast) rate through the purge valve 118 (e.g., with the purge valve 118 being widely open and/or open for a relatively longer amount of time as compared with typical or default operation) while the FTIV 120 is closed. In certain embodiments, the process 300 then either repeats or ends at step 324.

Conversely, in various embodiments, when it is instead determined in step 318 that one or more of the conditions of steps 306, 312, and 316 are not satisfied, then the process 300 instead proceeds to step 321, as the FTIV 120 is opened. Specifically, in various embodiments, during step 321, the controller(s) 130 provide instructions for the FTIV 120 to move to an open position, and the instructions are implemented via the FTIV 120 and/or via one or more actuators thereof and/or coupled thereto. Also in various embodiment, when this occurs, purge flow is applied in accordance with a second flow calibration set (step 322). In various embodiments, a relatively more conservative purging of the carbon canister 108 is performed (in contrast to step 320 above). Specifically, in various embodiments, during step 322, the controller(s) 130 control purge flow of carbon emissions from the carbon canister 108 to the engine 104 at a second (relatively slower, as compared with the first rate of step 320) rate through the purge valve 118 (e.g., with the purge valve 118 being at least significantly closed (or biased closed for a relatively longer amount of time), or at least more closed (or biased closed for a relatively longer amount of time) as compared with step 320) while the FTIV 120 is open. In certain embodiments, the process 300 then either repeats or ends at step 324.

Figure 4:
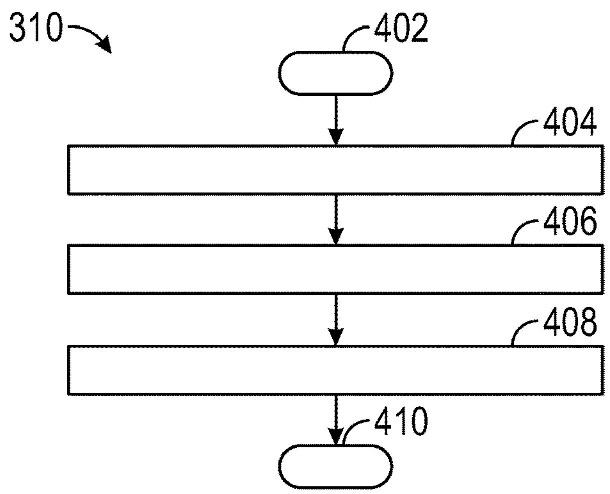
FIGS. 4-7 are flowcharts of various steps of the process of FIG. 3, specifically pertaining to diagnostics of the process of FIG. 3, in accordance with exemplary embodiments.

With reference to FIG. 4, an exemplary implementation is provided with respect to the diagnostics step (step 310) of FIG. 3. The diagnostics step 310 is described below in connection with FIG. 4 as well as FIGS. 5-7 (which provide exemplary implementations of the steps of FIG. 4) in accordance with various embodiments.

As illustrated in FIG. 4, in various embodiments, the diagnostics of step 310 of FIG. 3 starts at step 402 once diagnostics begin. In various embodiments, sensor data is obtained at step 404. In various embodiments, the sensor data obtained in step 404 corresponds to the sensor data collection of step 304 of FIG. 3.

Also in various embodiments as depicted in FIG. 4, stuck open diagnostics are performed (strep 406). In various embodiments, during step 406, one or more processors 206 utilize the sensor data in providing diagnostics as to whether the FTIV 120 is in a stuck open position (e.g., in which the FTIV 120 may be open even though it is commanded to be shut). In various embodiments, the stuck open diagnostics are performed in accordance with the steps of FIGS. 5 and 6 and described further below in connection therewith.

Also in various embodiments as depicted in FIG. 4, stuck closed diagnostics are also performed (strep 408). In various embodiments, during step 408, one or more processors 206 utilize the sensor data in providing diagnostics as to whether the FTIV 120 is in a stuck closed position (e.g., in which the FTIV 120 may be closed even though it is commanded to be open). In various embodiments, the stuck closed diagnostics are performed in accordance with the steps of FIG. 7 and described further below in connection therewith.

In various embodiments, the diagnostics step 310 then terminates at step 410 (i.e., after the stuck open diagnostics of step 406 and the stuck closed diagnostics of step 408 are both performed). In various embodiments, the process 300 then returns to step 312 of FIG. 3, as results of the diagnostics are utilized.

Figure 5:
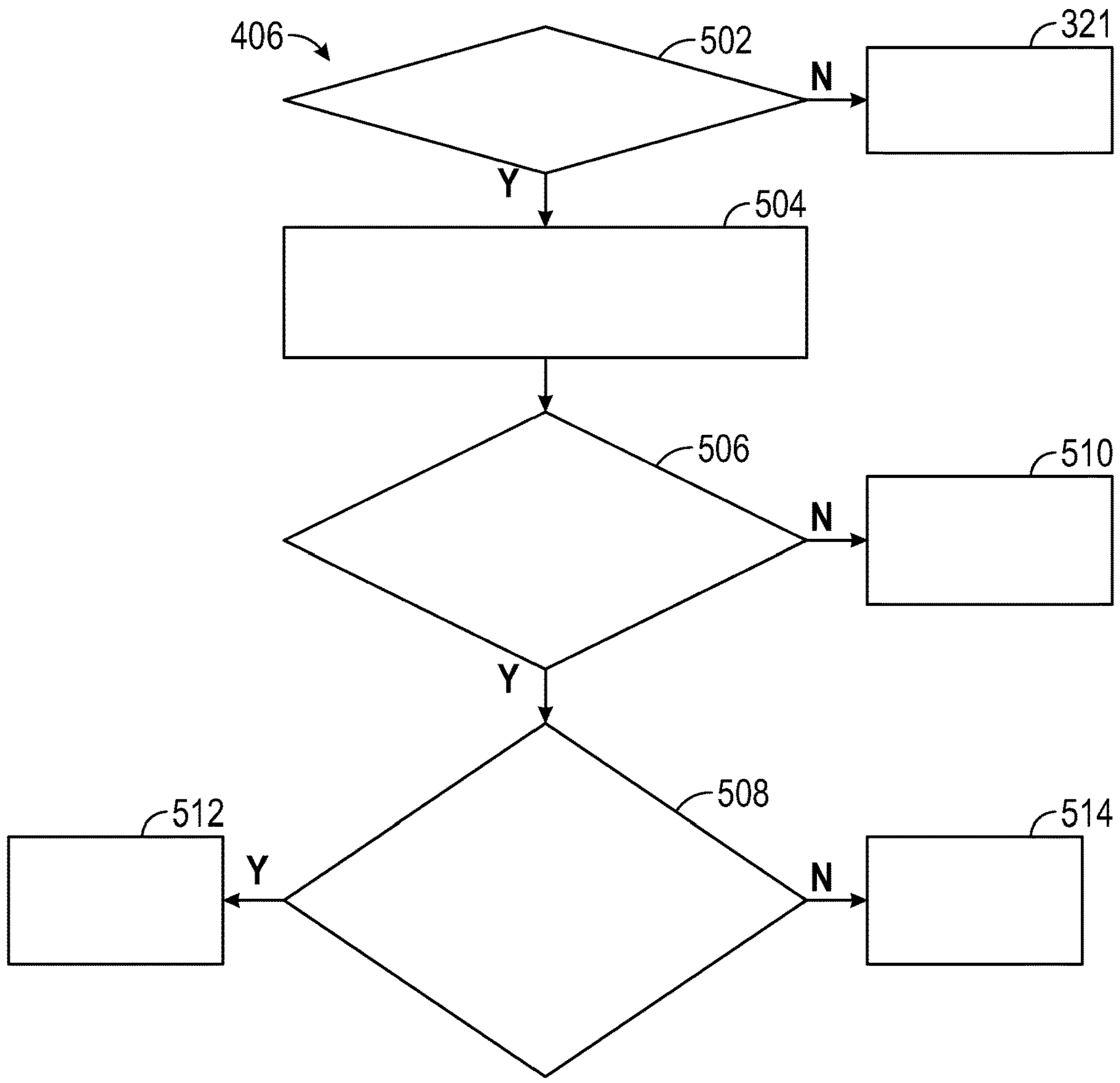
Figure 6:
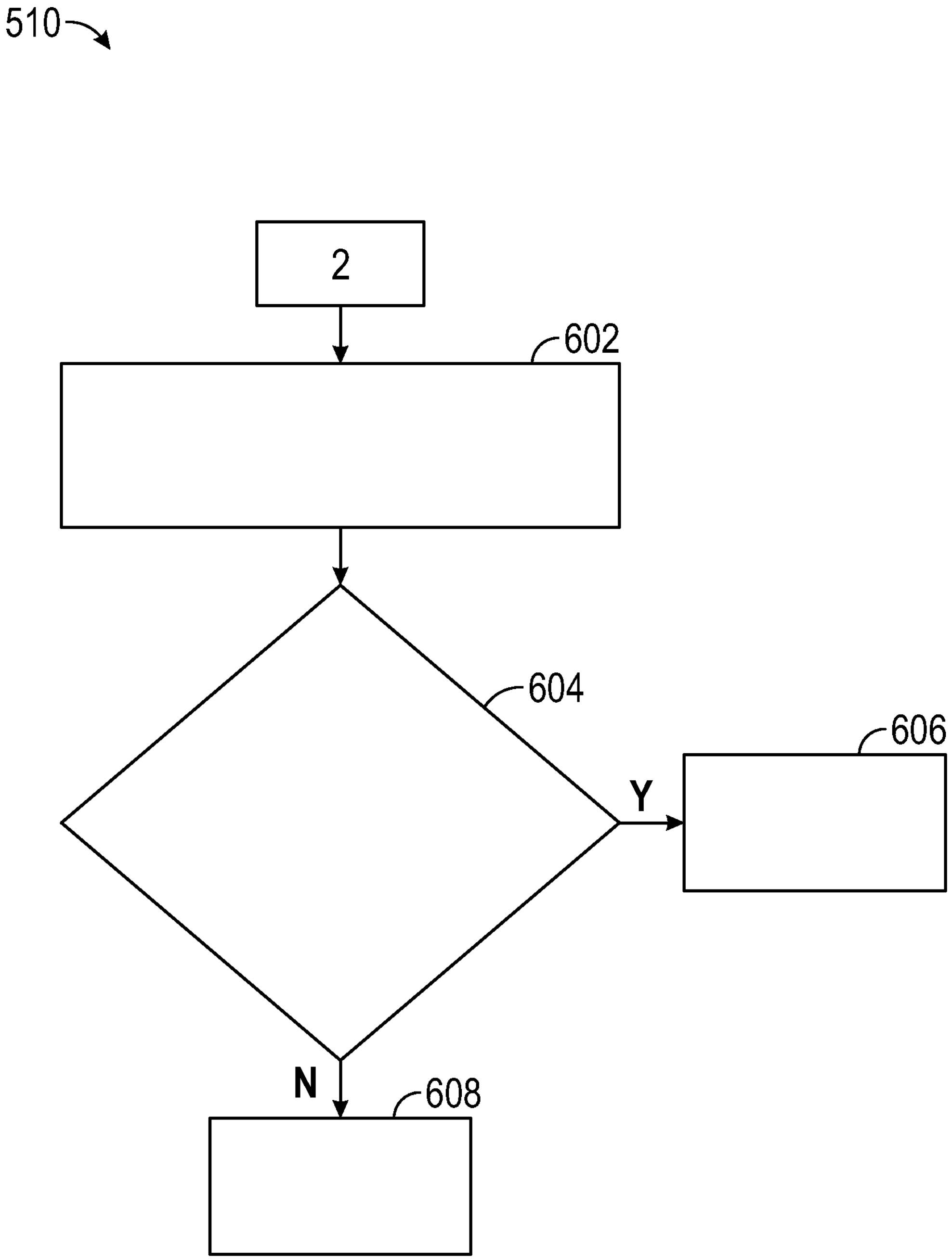

With reference to FIGS. 5 and 6, an exemplary implementation is provided for the providing of the stuck open diagnostics of step 406 of FIG. 4.

First, with reference to FIG. 5, in various embodiments, a determination is made as to whether diagnostic criteria have been met for the stuck open diagnostics (step 502). In various embodiments, this determination is made by one or more processors 206 based on the sensor data. In various embodiments, the diagnostic criteria refer to one or more factors indicating that the vehicle 100 is making a “cold start” after remaining stationary for a significant amount of time. For example, in certain embodiments, the diagnostic criteria include one or more of the following, among other possible criteria: whether a coolant temperature for engine coolant is less than a predetermined threshold: whether intake air temperature is less than a predetermined threshold; and/or whether a soak time (e.g., an amount of time since the engine 104 has last operated for the vehicle 100) exceeds a predetermined amount of time. In various embodiments, one or more processors 206 make such determinations based on a comparison of such respective values from the sensor data with predetermined thresholds that are stored in the memory 208 of FIG. 2 as stored values 218 thereof.

In various embodiments, if it is determined in step 502 that the diagnostic criteria have not been met, then the process 300 returns to step 321 of FIG. 3, in which the FTIV 120 is opened (and in which the purge flow calibration is set to the second rate of step 322, as described above).

Conversely, if it is instead determined in step 502 that the diagnostic criteria have been met, then the process 300 instead proceeds to step 504. In various embodiments, during step 504, the vent solenoid 116 and the FTIV 120 are both closed. In various embodiments, this is performed via instructions that are provided via one or more processors 206. Also in various embodiments, this generates a vacuum in the system.

In addition, in various embodiments, a determination is made as to whether flow in the system is greater than a predetermined threshold (step 506). In various embodiments, this determination is made by one or more processors 206 based on pressure measurements made by the first pressure sensor 122 of FIG. 1.

In various embodiments, if it is determined in step 506 that the flow is greater than the predetermined threshold, then the process 300 proceeds to step 510, for implementation of a control strategy as depicted in FIG. 6.

Specifically, with reference to FIG. 6, during this control strategy of step 510, the vent solenoid 116 is commanded to open while the FTIV 120 is commanded closed (step 602), thereby releasing the vacuum in the system. In various embodiments, this is performed in accordance with instructions provided via one or more processors 206.

With continued reference to FIG. 6, also during the control strategy of step 510, a determination in made as to whether a pressure difference is greater than a predetermined threshold (step 604). In various embodiments, once the vacuum in the system is released, an integrated pressure difference is calculated between the pressure readings of the first pressure sensor 122 versus the second pressure sensor 124 of FIG. 1. In various embodiments, one or more processors 206 calculate this integrated pressure difference and compare the integrated pressure difference with the threshold value as stored in the memory 208 as one or more stored values 218 therein.

In various embodiments, if it is determined in step 604 that the pressure difference is greater than the predetermined threshold, then it is determined that the FTIV 120 is not stuck open (step 606). Specifically, in various embodiments, one or more processors 206 make this determination, and provide a diagnostic “Pass” as a result.

Conversely, also in various embodiments, if it is instead determined in step 604 that the pressure difference is less than the predetermined threshold, then it is determined instead that the FTIV 120 is stuck open (step 608). Specifically, in various embodiments, one or more processors 206 make this determination, and provide a diagnostic “Fail” as a result.

In either case, in various embodiments, the results of the diagnostics are utilized in various steps of the process 300, such as steps 312-316 of FIG. 3.

With reference back to FIG. 5, in various embodiments, if it is instead determined in step 506 that the flow is less than or equal to the predetermined threshold, then in various embodiments the process 300 proceeds instead to step 508, described below. Specifically, in various embodiments, during step 508 a determination is made as to whether a pressure difference is greater than a predetermined threshold. In various embodiments, during step 508, as the vacuum is maintained, an integrated pressure difference is calculated between the pressure readings of the first pressure sensor 122 versus the second pressure sensor 124 of FIG. 1. In various embodiments, one or more processors 206 calculate this integrated pressure difference and compare the integrated pressure difference with the threshold value as stored in the memory 208 as one or more stored values 218 therein (similar to step 604 of FIG. 6, except that in step 508 the vacuum is maintained).

In various embodiments, if it is determined in step 508 that the pressure difference is greater than the predetermined threshold, then it is determined that the FTIV 120 is not stuck open (step 512). Specifically, in various embodiments, one or more processors 206 make this determination, and provide a diagnostic "Pass" as a result.

Conversely, also in various embodiments, if it is instead determined in step 508 that the pressure difference is less than the predetermined threshold, then it is determined instead that the FTIV 120 is stuck open (step 514). Specifically, in various embodiments, one or more processors 206 make this determination, and provide a diagnostic "Fail" as a result.

In either case, in various embodiments, the results of the diagnostics are utilized in various steps of the process 300, such as steps 312-316 of FIG. 3.

Figure 7:
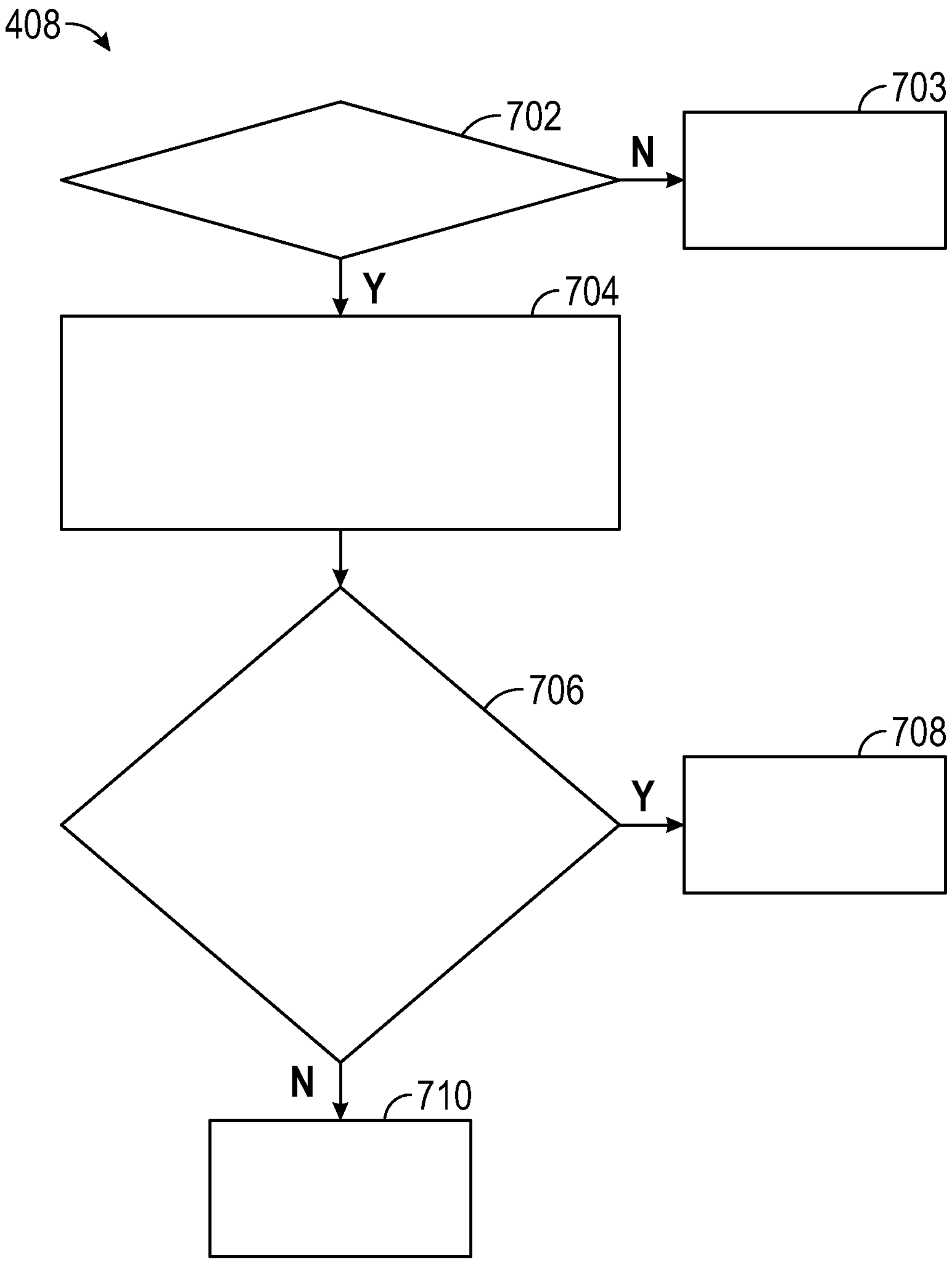

With reference now to FIG. 7, an exemplary implementation is provided for the step of providing the stuck closed diagnostics of step 408.

First, with continued reference to FIG. 7, in various embodiments, a determination is made as to whether diagnostic criteria have been met for the stuck closed diagnostics (step 702). In various embodiments, this determination is made by one or more processors 206 based on the sensor data. In various embodiments, the diagnostic criteria refer to one or more factors indicating that the vehicle 100 is making a "cold start" after remaining stationary for a significant amount of time, such as the criteria described above in connection with step 502 of FIG. 5. For example, in certain embodiments, the diagnostic criteria include one or more of the following, among other possible criteria: whether a coolant temperature for engine coolant is less than a predetermined threshold: whether intake air temperature is less than a predetermined threshold; and/or whether a soak time (e.g., an amount of time since the engine 104 has last operated for the vehicle 100) exceeds a predetermined amount of time. In various embodiments, one or more processors 206 make such determinations based on a comparison of such respective values from the sensor data with predetermined thresholds that are stored in the memory 208 of FIG. 2 as stored values 218 thereof.

In various embodiments, if it is determined in step 702 that the diagnostic criteria have not been met, then the process 300 returns to step 703, in which a determination is made that effective diagnostics are not available. In various embodiments, this is determined by one or more processors 206.

Conversely, if it is instead determined in step 702 that the diagnostic criteria have been met, then the process 300 instead proceeds to step 704. In various embodiments, during step 704, the vent solenoid 116 and the FTIV 120 are both opened. In various embodiments, this is performed via instructions that are provided via one or more processors 206. Also in various embodiments, this releases a vacuum in the system as the stuck closed diagnostic is being executed.

In various embodiments, during step 706, a determination is made as to whether a pressure difference is greater than a predetermined threshold. In various embodiments, during step 706, as the vacuum is maintained, an integrated pressure difference is calculated between the pressure readings of the first pressure sensor 122 versus the second pressure sensor 124 of FIG. 1. In various embodiments, one or more processors 206 calculate this integrated pressure difference and compare the integrated pressure difference with the threshold value as stored in the memory 208 as one or more stored values 218 therein.

In various embodiments, if it is determined in step 706 that the pressure difference is less than the predetermined threshold, then it is determined that the FTIV 120 is not stuck closed (step 708). Specifically, in various embodiments, one or more processors 206 make this determination, and provide a diagnostic "Pass" as a result.

Conversely, also in various embodiments, if it is instead determined in step 706 that the pressure difference is greater than the predetermined threshold, then it is determined instead that the FTIV 120 is stuck closed (step 710). Specifically, in various embodiments, one or more processors 206 make this determination, and provide a diagnostic "Fail" as a result.

In either case, in various embodiments, the results of the diagnostics are utilized in various steps of the process 300, such as steps 312-316 of FIG. 3.

Accordingly, methods, systems, and vehicles are provided for controlling carbon emissions of an evaporative emissions system of a vehicle. As described above and in connection with the Figures, in various embodiments multiple valves and pressure sensors are utilized in connection with a disclosed control algorithm for selectively opening and closing the valves, including based on the measured pressures and a difference therebetween, in controlling carbon emissions for the evaporative emissions system while maintaining operation of an engine associated with the evaporative emissions system.

It will be appreciated that the systems, vehicles, and methods may vary from those depicted in the Figures and described herein. For example, the vehicle 100 of FIG. 1, the evaporative emissions system 102, and/or components thereof may differ from that depicted in FIG. 1 and/or or as described above. Likewise, the control system(s) 130 and/or components thereof may differ from these depicted in FIG. 2 and/or as described above. It will similarly be appreciated that the steps of the processes and implementations of FIGS. 3-7 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An evaporative emissions system for a vehicle, the evaporative emissions system comprising:

an engine;

a fuel tank configured to provide fuel for the engine;

a plurality of sensors configured to generate sensor data for the evaporative emissions system;

a carbon canister configured to capture hydrocarbon emissions from the fuel tank;

a first valve disposed between the carbon canister and the engine;

a second valve disposed between the fuel tank and the carbon canister; and one or more processors that are configured to at least facilitate selectively controlling the first and second valves, to thereby control hydrocarbon emissions from the carbon canister and maintain performance of the engine, using the sensor data;

wherein the one or more processors are further configured to at least facilitate:

determining, using the sensor data, whether conditions are appropriate for aggressive purging of the carbon canister, using the sensor data;

when it is determined that the conditions are appropriate for the aggressive purging, commanding the first valve to be biased open and the second valve to be closed while providing instructions for the aggressive purging at a first flow rate; and when it is determined that the conditions are not appropriate for the aggressive purging, commanding the second valve to be open while providing instructions for conservative purging at a second flow rate that is less than the first flow rate.

2. The evaporative emissions system of claim 1, wherein the one or more processors are further configured to at least facilitate determining whether the conditions are appropriate for the aggressive purging based on a transmission state of the vehicle, a fuel tank pressure, and diagnostics performed on the evaporative emissions system.

3. The evaporative emissions system of claim 1, wherein:

the plurality of sensors comprise a plurality of pressure sensors are configured to measure a plurality of pressure values for the evaporative emissions system; and the one or more processors are configured to at least facilitate selectively controlling the second valve using the plurality of pressure values.

4. The evaporative emissions system of claim 3, wherein the plurality of pressure sensors comprise:

a first pressure sensor disposed between the second valve and the carbon canister and configured to measure a first pressure therebetween; and a second pressure sensor disposed between the fuel tank and the second valve and configured to measure a second pressure proximate the fuel tank;

wherein the one or more processors are configured to selectively control the second valve using both the first pressure and the second pressure.

5. The evaporative emissions system of claim 4, wherein the one or more processors are further configured to at least facilitate:

determining a difference between the first pressure and the second pressure; and selectively controlling the second valve using the difference between the first pressure and the second pressure.

6. The evaporative emissions system of claim 5, further comprising:

a vent solenoid;

wherein the one or more processors are further configured to at least facilitate:

performing diagnostics for the evaporative emissions system, by selectively generating and releasing a vacuum in the evaporative emissions system via selective opening and closing of the first valve and the vent solenoid, and determining the difference between the first pressure and the second pressure as the vacuum is generated and released; and utilizing the diagnostics for control of hydrocarbon emissions for the evaporative emissions system.

7. A method for controlling carbon emissions of an evaporative emissions system of a vehicle having an engine, a fuel tank configured to provide fuel for the engine, and a carbon canister configured to capture hydrocarbon emissions from the fuel tank, the method comprising:

obtaining sensor data via a plurality of sensors for the evaporative emissions system; and selectively controlling a first valve disposed between the carbon canister and the engine and a second valve disposed between the fuel tank and the carbon canister, via one or more processors, to thereby control hydrocarbon emissions from the carbon canister and maintain performance of the engine, using the sensor data;

wherein the method further comprises:

determining, via the one or more processors using the sensor data, whether conditions are appropriate for aggressive purging of the carbon canister;

when it is determined that the conditions are appropriate for the aggressive purging, commanding, via the one or more processors, the first valve to be biased open and the second valve to be closed while providing instructions for the aggressive purging at a first flow rate; and when it is determined that the conditions are not appropriate for the aggressive purging, commanding, via the one or more processors, the second valve to be open while providing instructions for conservative purging at a second flow rate that is less than the first flow rate.

8. The method of claim 7, wherein the determining of whether the conditions are appropriate for the aggressive purging is made via the one or more processors based on a transmission state of the vehicle, a fuel tank pressure, and diagnostics performed on the evaporative emissions system.

9. The method of claim 7, wherein:

the step of obtaining the sensor data comprises measuring a plurality of pressure values via a plurality of pressure sensors for the evaporative emissions system; and the method further includes selectively controlling the second valve, via the one or more processors, using the plurality of pressure values.

10. The method of claim 9, wherein the step of measuring the plurality of pressure values comprises:

measuring a first pressure between the second valve and the carbon canister via a first pressure sensor disposed therebetween; and measuring a second pressure between the second valve and the fuel tank via a second pressure sensor disposed therebetween.

11. The method of claim 10, further comprising:

determining, via the one or more processors, a difference between the first pressure and the second pressure; and selectively controlling the second valve, via the one or more processors, using the difference between the first pressure and the second pressure.

12. The method of claim 11, further comprising:

performing diagnostics for the evaporative emissions system, via the one or more processors, by selectively generating and releasing a vacuum in the evaporative emissions system via selective control of the first valve and a vent solenoid, via the one or more processors;

determining the difference between the first pressure and the second pressure, via the one or more processors, as the vacuum is generated and released; and utilizing the diagnostics for control of hydrocarbon emissions for the evaporative emissions system, via the one or more processors.

13. A control system for controlling carbon emissions of an evaporative emissions system of a vehicle having an engine, a fuel tank configured to provide fuel for the engine, and a carbon canister configured to capture hydrocarbon emissions from the fuel tank, the control system comprising:

a plurality of sensors configured to obtain sensor data for the evaporative emissions system; and one or more processors that are coupled to the plurality of sensors and that are configured to at least facilitate selectively controlling a first valve disposed between the carbon canister and the engine and a second valve disposed between the fuel tank and the carbon canister, to thereby control hydrocarbon emissions from the carbon canister and maintain performance of the engine, using the sensor data;

wherein the one or more processors are further configured to at least facilitate:

determining, using the sensor data, whether conditions are appropriate for aggressive purging of the carbon canister;

when it is determined that the conditions are appropriate for the aggressive purging, commanding the first valve to be biased open and the second valve to be closed while providing instructions for the aggressive purging at a first flow rate; and when it is determined that the conditions are not appropriate for the aggressive purging, commanding the second valve to be open while providing instructions for conservative purging at a second flow rate that is less than the first flow rate.

14. The control system of claim 13, wherein the one or more processors are further configured to at least facilitate determining whether the conditions are appropriate for the aggressive purging based on a transmission state of the vehicle, a fuel tank pressure, and diagnostics performed on the evaporative emissions system.

15. The control system of claim 13, wherein:

the plurality of sensors comprise a plurality of pressure sensors configured to measure a plurality of pressure values for the evaporative emissions system; and the one or more processors are further configured to at least facilitate selectively controlling the second valve using the plurality of pressure values.

16. The control system of claim 15, wherein:

the plurality of pressure sensors comprise:

a first pressure sensor disposed between the second valve and the carbon canister and configured to measure a first pressure therebetween; and a second pressure sensor disposed between the second valve and the fuel tank and configured to measure a second pressure therebetween; and the one or more processors are further configured to at least facilitate:

determining a difference between the first pressure and the second pressure; and selectively controlling the second valve using the difference between the first pressure and the second pressure.

17. The control system of claim 16, wherein the one or more processors are further configured to at least facilitate:

performing diagnostics for the evaporative emissions system by selectively generating and releasing a vacuum in the evaporative emissions system via selective opening and closing of the first valve and a vent solenoid, via the one or more processors;

determining the difference between the first pressure and the second pressure as the vacuum is generated and released; and utilizing the diagnostics for control of hydrocarbon emissions for the evaporative emissions system.

* * * * *